(No Model.) 3 Sheets—Sheet 1.

J. HORNSBY, F. C. SOUTHWELL & J. INNOCENT.
DROPPING CRADLE FOR HARVESTING MACHINES.

No. 327,087. Patented Sept. 29, 1885.

(No Model.) 3 Sheets—Sheet 2.
J. HORNSBY, F. C. SOUTHWELL & J. INNOCENT.
DROPPING CRADLE FOR HARVESTING MACHINES.

No. 327,087. Patented Sept. 29, 1885.

Witnesses
Nellie L. Holmes.
Jas. Young.

Inventors
J. Hornsby,
F. C. Southwell,
J. Innocent,
By attys
Baldwin, Hopkins & Peyton.

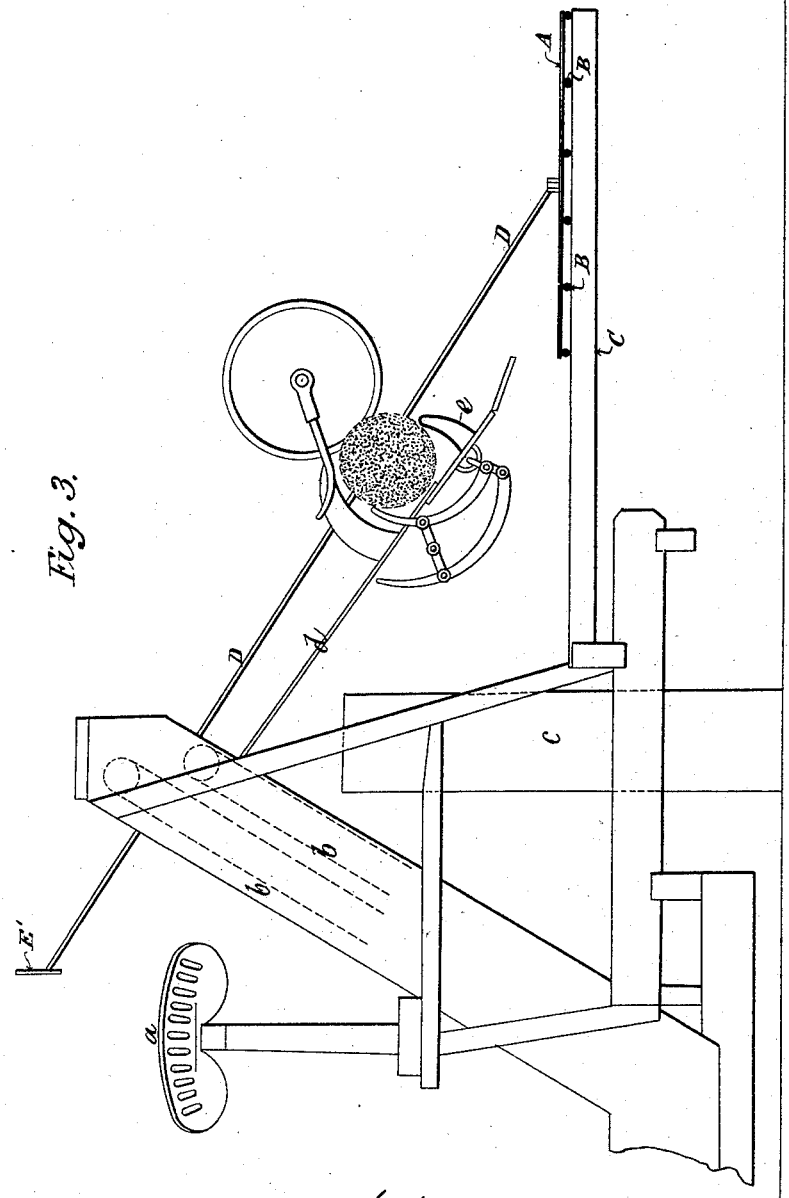

UNITED STATES PATENT OFFICE.

JAMES HORNSBY, FREDERICK CHARLES SOUTHWELL, AND JOHN INNOCENT, OF GRANTHAM, COUNTY OF LINCOLN, ENGLAND.

DROPPING-CRADLE FOR HARVESTING-MACHINE.

SPECIFICATION forming part of Letters Patent No. 327,087, dated September 29, 1885.

Application filed September 1, 1884. (No model.)

*To all whom it may concern:*

Be it known that we, JAMES HORNSBY, FREDERICK CHARLES SOUTHWELL, and JOHN INNOCENT, all of the Spittlegate Iron Works, Grantham, in the county of Lincoln, England, subjects of the Queen of Great Britain, have invented certain new and useful Improvements in Dropping-Cradles for Harvesting-Machines, of which the following is a specification.

Our invention relates to improvements in dropping-cradles adapted for use in connection with self-binding harvesters; and our object is to provide a dropping-cradle the operation of which is controlled by the driver of the machine to which it is attached, in order that the sheaves may be dropped at proper intervals, so as to form rows to facilitate the operation of stooking.

The apparatus by which we effect this consists of a sliding cradle or carrier mounted alongside the sheaf-binder and reciprocating in the direction of the length of the sheaves.

Figure 1:
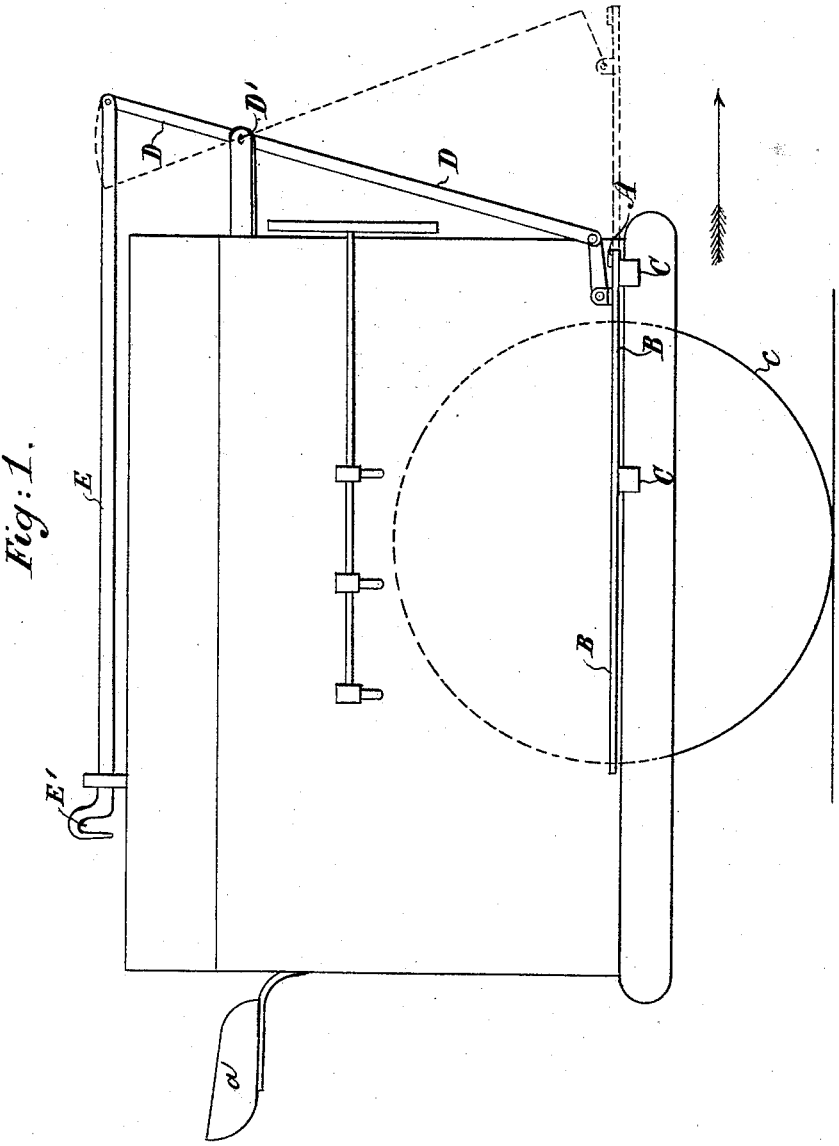
Figure 2:
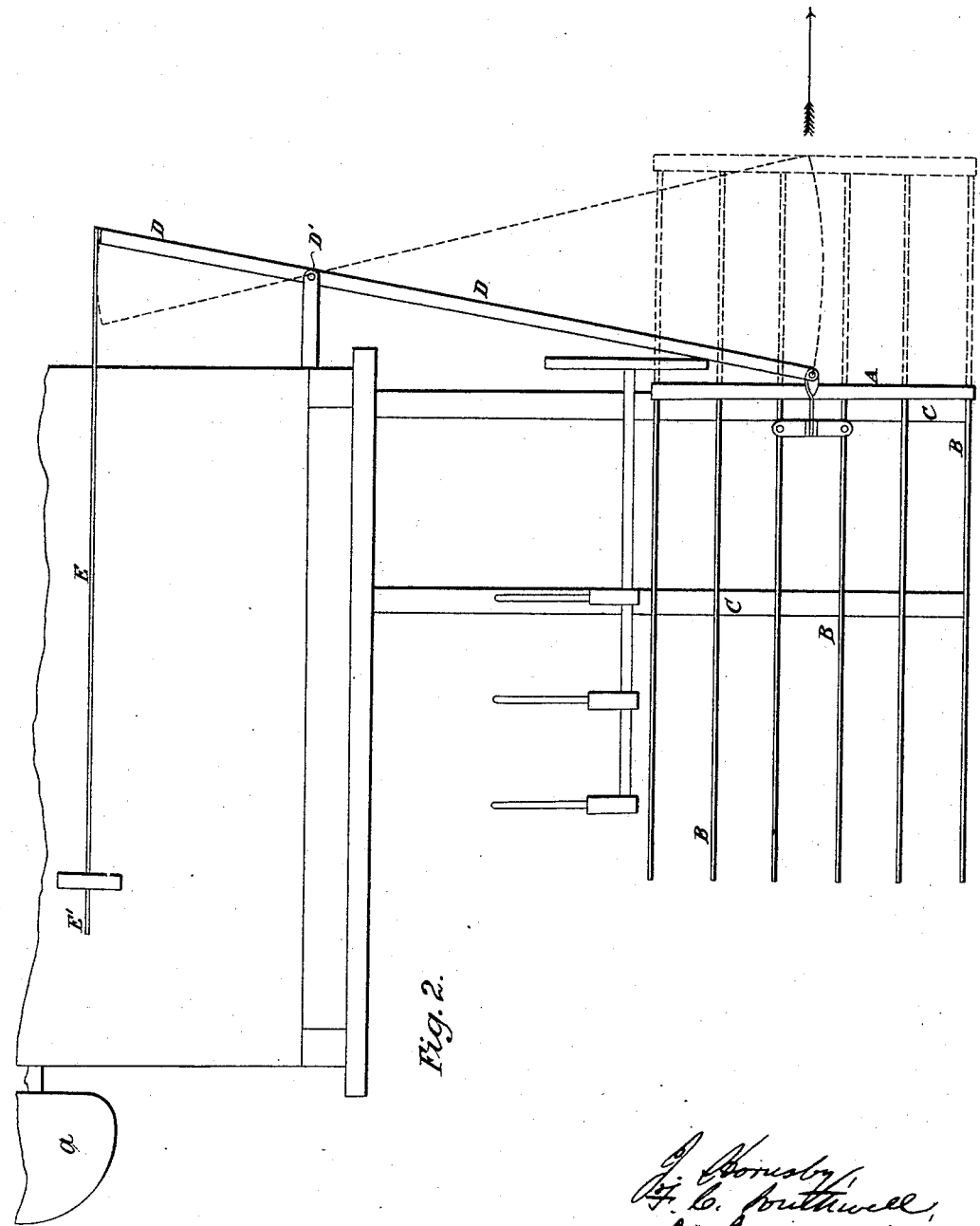

In the drawings, Figure 1 is a side elevation, and Fig. 2 is a plan, and Fig. 3 is a back view, of part of a Hornsby self-binding reaper provided with a cradle constructed according to our invention.

In these figures the cutting apparatus and platform are omitted. They are situated behind Fig. 1, at the top of Fig. 2, and to the left of Fig. 3. The machine moves in the direction of the arrows.

$a$ is the driver's seat. $b$ $b$ are the two endless bands or sheets which carry the cut crop over the main driving-wheel $c$ and deliver it onto the inclined board $d$, down which it slides onto the arms $e$ of the grain-receptacle, which hold it while being tied by the binding apparatus, and which are then withdrawn to allow the sheaf to fall onto the ground, when the machine is not provided with a cradle, or into the cradle in the present case.

The sliding cradle consists of a bar, A, provided with straight rods B, which extend rearwardly by the side and beneath the level of the grain-receptacle, parallel, or nearly so, with the stalks of the grain therein, and rest on a support formed by bars C C fixed to the frame of the machine. The cradle reciprocates transversely to its support and lengthwise of the bound sheaves. To discharge the sheaves the cradle is drawn forward into the position shown by the dotted lines. This is done by means of the lever D, which is pivoted at D' to the frame of the machine, and having one end connected to the cradle and the other to the rod E, which is provided with a handle, E', within the reach of the driver. By pulling the rod E toward him the driver draws the cradle forward, thus discharging the sheaves, and he then replaces the cradle by pushing the rod E away from him.

The bars C, forming the support for the cradle, prevent the sheaves from following the cradle as it is drawn forward to discharge them. The friction between the bars C and the stalks of grain which project through the spaces between the rods B of the cradle is much greater than that between the grain and these rods, the stalks of grain extending parallel, or substantially parallel, with the rods B while crossing the bars C and resting upon them until discharged, as the cradle is moved forward.

In place of the cradle being drawn back in a horizontal plane, the bar A may be raised so as to assist in the delivery of the sheaves.

Having now described the nature of our said invention and the manner of performing the same, we would have it understood that we do not confine ourselves to the exact details shown, but that what we claim is—

The combination of the grain-receptacle, the sliding cradle formed with rods extending by the side of the grain-receptacle parallel, or nearly so, with the stalks of the grain therein, and upon which the bound sheaves are delivered from the grain-receptacle with the stalks of grain extending lengthwise of them, the support for the sliding cradle, and means for reciprocating the cradle in the direction of the length of the sheaves, substantially as and for the purpose set forth.

JAMES HORNSBY.
FREDERICK CHARLES SOUTHWELL.
JOHN INNOCENT.

Witnesses:
WILLIAM HORNSBY,
R. A. SMITHURST.